United States Patent
Boland

(10) Patent No.: US 9,950,694 B2
(45) Date of Patent: Apr. 24, 2018

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 261 days.

(21) Appl. No.: 13/877,215

(22) PCT Filed: Sep. 30, 2010

(86) PCT No.: PCT/EP2010/064561
§ 371 (c)(1),
(2), (4) Date: Jun. 12, 2013

(87) PCT Pub. No.: WO2012/041378
PCT Pub. Date: Apr. 5, 2012

(65) Prior Publication Data
US 2013/0247324 A1    Sep. 26, 2013

(51) Int. Cl.
*B60S 1/38* (2006.01)
*B60S 1/40* (2006.01)

(52) U.S. Cl.
CPC ............. *B60S 1/381* (2013.01); *B60S 1/3858* (2013.01); *B60S 1/3877* (2013.01); *B60S 1/3808* (2013.01); *B60S 1/3856* (2013.01); *B60S 1/4048* (2013.01)

(58) Field of Classification Search
CPC .... B60S 1/3858; B60S 1/3877; B60S 1/3856; B60S 1/3808; B60S 1/386; B60S 1/3881; B60S 1/381; B60S 2001/3841
USPC .......... 15/250.44–250.48, 250.452, 250.201, 15/250.32
See application file for complete search history.

(56) References Cited

U.S. PATENT DOCUMENTS

| 3,088,155 | A | * | 5/1963 | Smithers | 15/250.201 |
| 5,231,730 | A | * | 8/1993 | Schmid et al. | 15/250.452 |
| 5,713,099 | A | * | 2/1998 | Maubray | 15/250.201 |
| 5,802,663 | A | * | 9/1998 | Criel | 15/250.452 |
| 2006/0265830 | A1 | * | 11/2006 | Walworth | B60S 1/38 15/236.02 |
| 2007/0113366 | A1 | | 5/2007 | Walworth et al. | |

(Continued)

FOREIGN PATENT DOCUMENTS

DE    10036115 A1 * 1/2003 ............... B60S 1/38
DE    20220355 U1    4/2004
(Continued)

OTHER PUBLICATIONS

FR2925001A1 (machine translation), 2010.*

*Primary Examiner* — Andrew A Horton
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which includes at least one longitudinal groove, in which groove at least one longitudinal strip of the carrier element is disposed, which windscreen wiper device comprises a connecting device for an oscillating arm, the wiper blade and the longitudinal strip are mutually fixated by mutually cooperating protrusion/recess means of the longitudinal strip and the connecting device at the location of the interconnection of the connecting device and the wiper blade, and wherein the wiper blade is allowed to move in longitudinal direction relative to the longitudinal strip outside the location of the interconnection of the connecting device and the wiper blade.

12 Claims, 4 Drawing Sheets

(56) References Cited

U.S. PATENT DOCUMENTS

| | | | |
|---|---|---|---|
| 2007/0214593 A1* | 9/2007 | Boland | 15/250.23 |
| 2009/0056049 A1* | 3/2009 | Jarasson et al. | 15/250.32 |
| 2010/0000041 A1* | 1/2010 | Boland | 15/250.32 |
| 2010/0024149 A1* | 2/2010 | Erdal | 15/250.32 |

FOREIGN PATENT DOCUMENTS

| | | | | |
|---|---|---|---|---|
| EP | 1876073 A1 | | 1/2008 | |
| EP | 2236366 A1 | | 10/2010 | |
| FR | 2868376 A1 | | 10/2005 | |
| FR | 2925001 A1 | * | 6/2009 | B60S 1/38 |
| FR | 2925437 A1 | * | 6/2009 | B60S 1/38 |
| GB | 2005532 A | | 4/1979 | |
| WO | WO 2010086064 A1 | * | 8/2010 | B60S 1/38 |

* cited by examiner

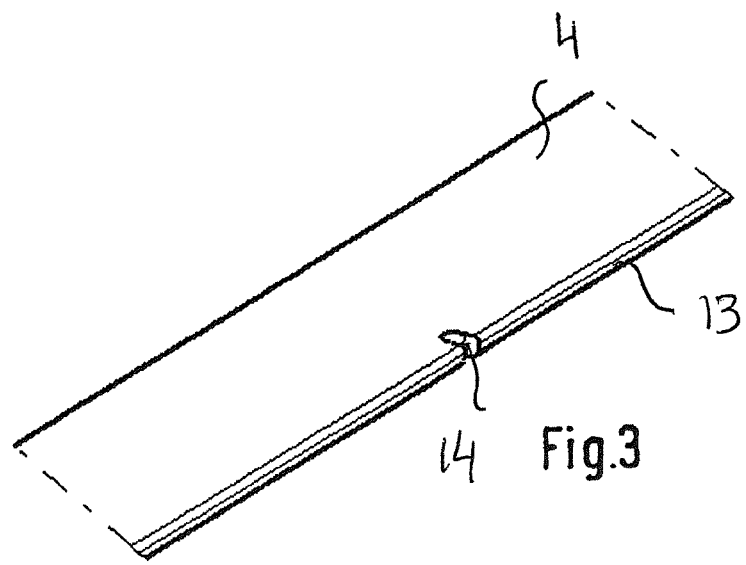
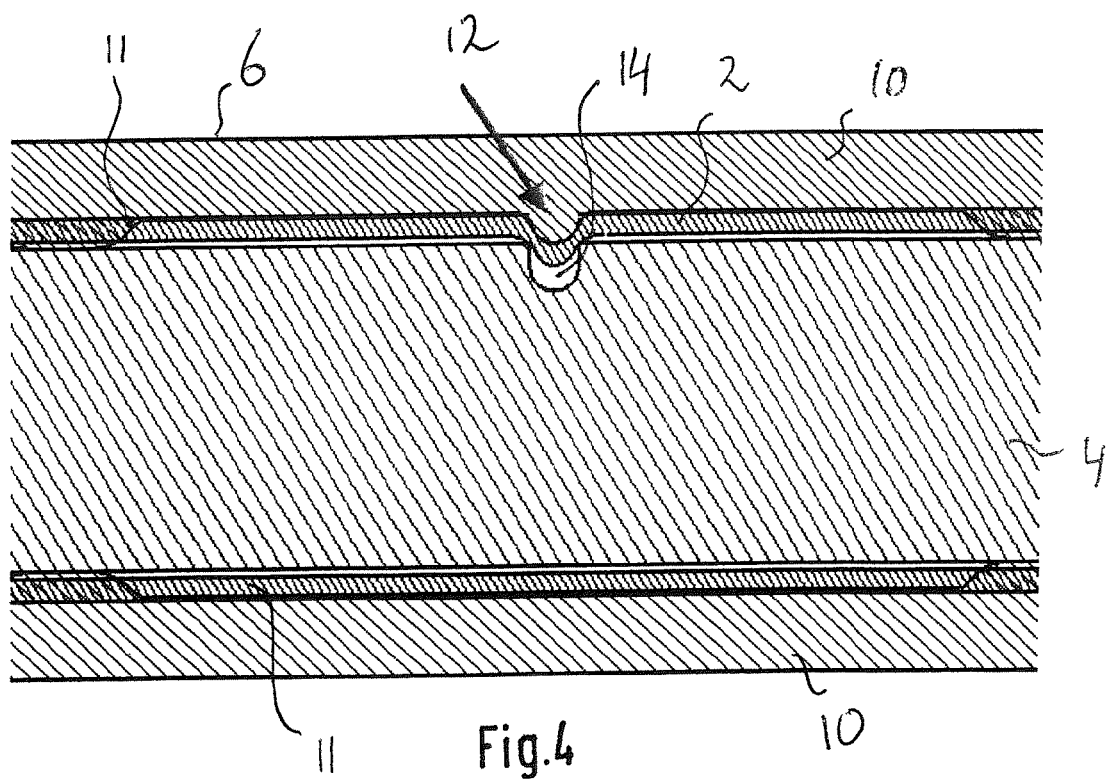

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm is pivotally connected to the connecting device about a pivot axis near one end thereof, with the interposition of a joint part, wherein the wiper blade comprises a spoiler at a side thereof facing away from the windscreen to be wiped.

2. Technical Field

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the wiper blade and the longitudinal strip are mutually fixated by mutually cooperating protrusion/recess means of the longitudinal strip and the connecting device at the location of the interconnection of the connecting device and the wiper blade, and wherein the wiper blade is allowed to move in longitudinal direction relative to the longitudinal strip outside the location of the interconnection of the connecting device and the wiper blade. In other words, the protrusion/recess means ensure that the wiper blade and the longitudinal strip are not allowed to mutually move under the connecting device, but in all other areas along the wiper blade a slight movement thereof is made possible in order to allow the wiper blade to follow any curvature of the windscreen to be wiped. It is this interaction between the protrusion/recess means that elastomeric material (i.e. usually rubber) of the wiper blade and material of the longitudinal strip (i.e. usually steel) are forced to engage with each other in a locking manner when the connecting device is mounted onto the wiper blade, all at the location under the connecting device.

Preferably, the connecting device has a substantially U-shaped cross-section, wherein legs of the U-shaped cross-section are connected to the elastomeric material of the wiper blade on opposite sides thereof, either through a clamping operation or through a crimping operation, and wherein the protrusion/recess means are provided on an inner wall of the legs, as well as on an exterior edge of the longitudinal strip.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. the groove (s) may be closed at one outer end.

In a preferred embodiment of a windscreen wiper device in accordance with the invention the connecting device is slightly deforming the wiper blade at the location of the interconnection of the connecting device and the wiper blade. the deformation is realized at the time of mounting the connecting device onto the wiper blade during assembly of all relevant parts of the wiper blade, wherein the deformation is particularly effected in a side region of the wiper blade, without having any influence on a bottom region thereof (i.e. containing a wiping lip of the wiper blade). Consequently, wiping properties of the wiper blade are not adversely affected. the deformation is preferably such that it is meandrous in shape in order to achieve a tight fixation of the longitudinal strip and the wiper blade under the connecting device.

In another preferred embodiment of a windscreen wiper device according to the invention the longitudinal strip is provided along an exterior edge thereof with at least one recess cooperating with a corresponding, sidewardly and inwardly extending protrusion on the connecting device, wherein the protrusion is not entering into the recess. Preferably, the protrusion is slightly deforming the wiper blade in the form of a C at the location of the recess.

In another preferred embodiment of a windscreen wiper device in accordance with the invention the longitudinal strip is provided along an exterior edge thereof with at least one sidewardly and outwardly extending protrusion cooperating with a corresponding recess on the connecting device. More in particular, the recess on the connecting device is formed between two sidewardly and inwardly extending protrusions on the connecting device.

In another preferred embodiment of a windscreen wiper device according to the invention the protrusions are slightly deforming the wiper blade in the form of a S at the location of the recess.

In another preferred embodiment of a windscreen wiper device in accordance with the invention the joint part is detachably connected to the connecting device by engaging protrusions of the connecting device, at the location of the pivot axis, in recesses provided in the joint part. This is preferably realized through a snapping or clipping operation.

In another preferred embodiment of a windscreen wiper device according to the invention the joint part has an at least substantially U-shaped cross-section at the location of its connection to the connecting device, and wherein the joint part is provided with a recess provided coaxially with the pivot axis. In particular, the protrusions extend outwards on either side of the connecting device and are preferably cylindrical in shape.

In the alternative, the protrusions are spherical or frusto-conical in shape. the protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes.

In another preferred embodiment of a windscreen wiper device in accordance with the invention the protrusions are provided with co-axial through holes. Accordingly, the wiper blade may then be connected to the oscillating arm on the basis of a so-called "sidelock system". The oscillating arm is provided with a joint pin or a pivot pin to be inserted in the co-axial through holes, the pivot pin protrudes in a direction towards the wiper blade and has a pivot axis extending in a direction of the oscillating movement of the oscillating arm.

In another preferred embodiment of a windscreen wiper device according to the invention the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

The present invention also refers to a wiper blade as defined above, as such.

THE DRAWINGS

The invention will now be explained more in detail with reference to figures illustrated in a drawing, wherein FIG. 1 is a perspective, schematic view of a preferred embodiment of a windscreen wiper device according to the invention, with (a part of) an oscillating arm;

FIG. 3 shows in detail a perspective view of a longitudinal strip according to a first preferred embodiment, as used in a windscreen wiper device of FIG. 1;

FIG. 4 shows the working principle of the mutual fixation of the wiper blade and the longitudinal strip at the location of the connecting device (in a top view in cross-section) according to the first preferred embodiment;

Figure 5:
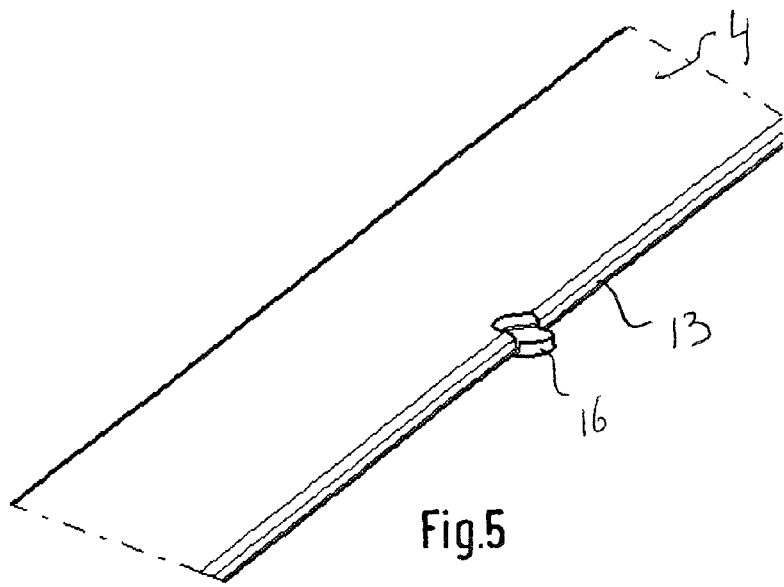
Figure 6:
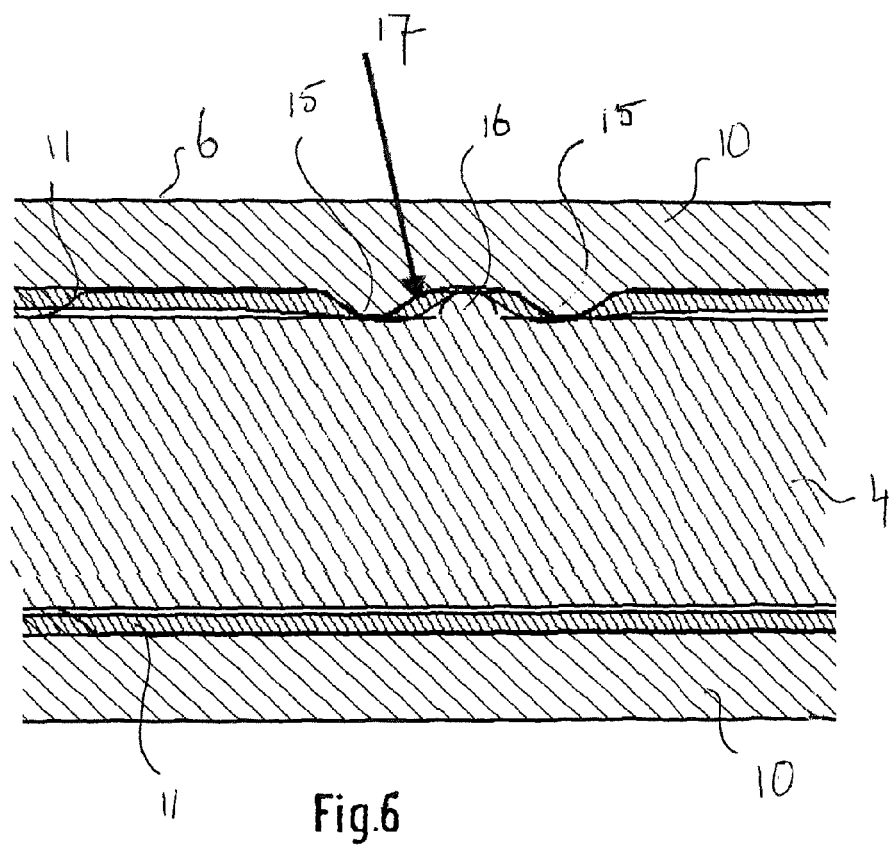

FIG. 5 corresponds to FIG. 3, but now relating to a longitudinal strip according to a second preferred embodiment;

FIG. 6 corresponds to FIG. 4, but now relating to the second preferred embodiment.

DETAILED DESCRIPTION

Figure 1:
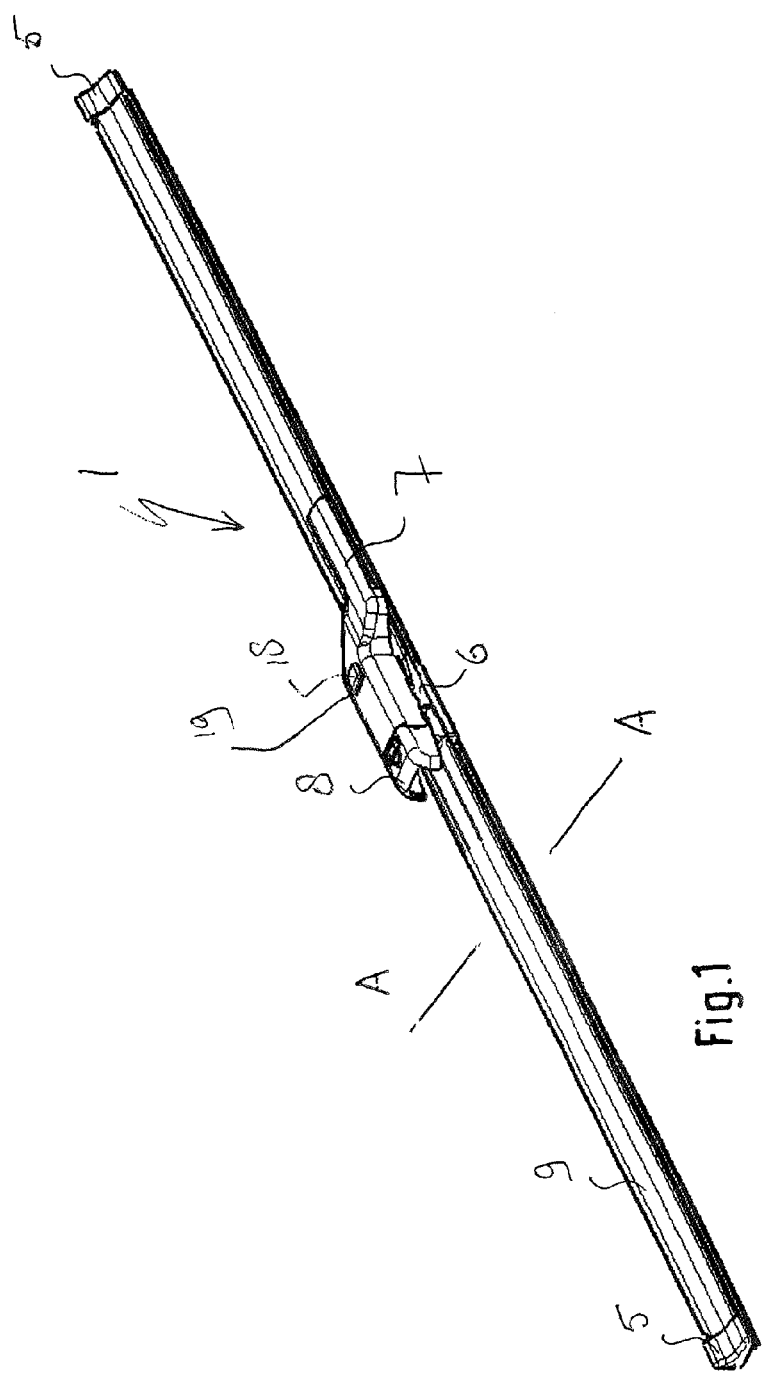
Figure 2:
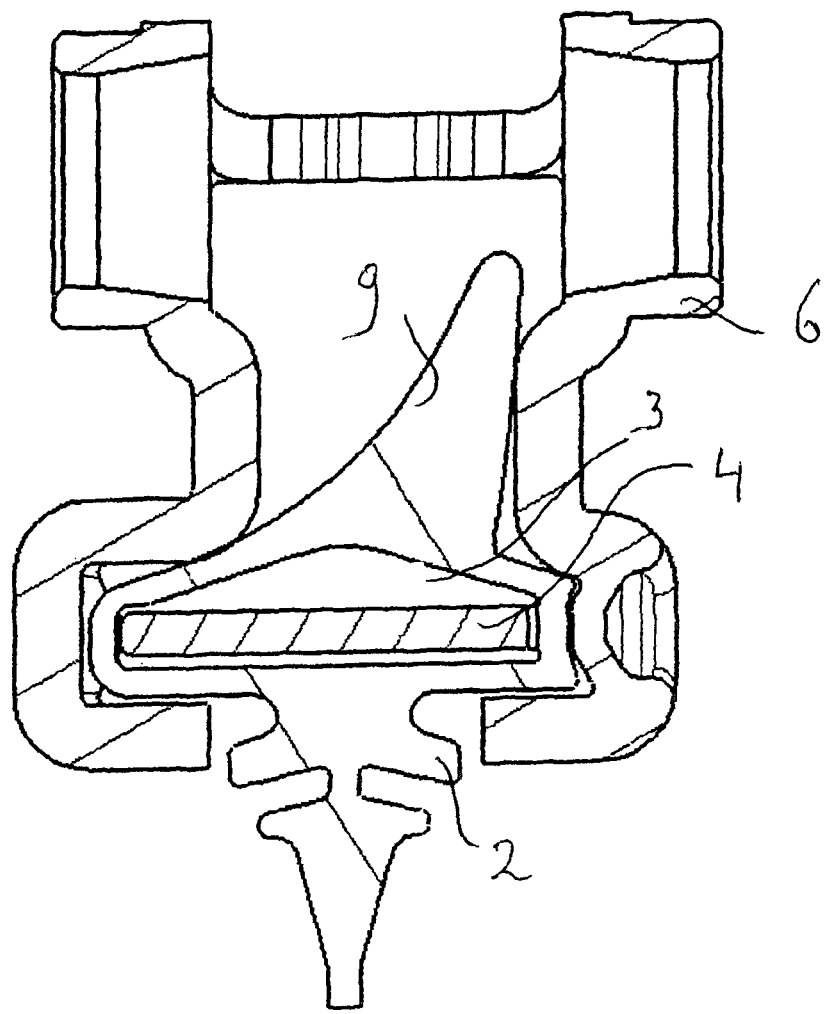
FIG. 2 is a cross-sectional view of the windscreen wiper device of FIG. 1 along the line A-A in FIG. 1.

FIGS. 1 and 2 show a preferred variant of a windscreen wiper device 1 according to the invention. the windscreen wiper device is built up of an elastomeric wiper blade 2 comprising a central longitudinal groove 3, wherein a longitudinal strip 4 made of spring band steel is fitted in the longitudinal groove 3 (see FIGS. 5, 6 and 7). the strip 4 forms a flexible carrier element for the rubber wiper blade 2, as it were, which is thus biassed in a curved position (the curvature in operative position being that of a windscreen to be wiped). An end of the strip 4 and/or an end of the wiper blade 2 is connected on either side of the windscreen wiper device 1 to respective connecting pieces or "end caps" 5. In this embodiment, the connecting pieces 5 are separate constructional elements, which may be form-locked as well as force-locked to both ends of the strip 4 and/or ends of the wiper blade 2. In another preferred variant, the connecting pieces 5 are in one piece with the strip 4 made of spring band steel. The windscreen wiper device 1 is furthermore built up of a connecting device 6 of metal for connecting an oscillating wiper arm 7 thereto, with the interposition of a joint part 8. The oscillating wiper arm 7 is pivotally connected to the connecting device 6 about a pivot axis near one end. The preferred embodiment of FIG. 1 according to the invention comprises a spoiler or "air deflector" 9 which is made in one piece with the rubber wiper blade 2 and which extends along the entire length thereof.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

FIGS. 3 and 4 show in perspective and in a top view (in cross-section) the working principle of the mutual fixation of the wiper blade 2 and the longitudinal strip 4 at the location of the connecting device 6 according to the first preferred embodiment. As mentioned earlier, this connecting device 6 has a U-shaped cross-section with legs 10 and a base 11. At least one of the legs 10, as shown in FIG. 4, is provided with a sidewardly and inwardly extending protrusion 12. the longitudinal strip 4, as shown in FIG. 3, is provided along an exterior edge 13 thereof with a recess 14 cooperating with the corresponding protrusion 12 on the connecting device 6. Consequently, when the connecting device 6 is mounted onto the wiper blade 2, that is when the legs 10 are clamped around rubber of the wiper blade 2, the rubber of the wiper blade 2 is slightly deformed in the shape of a C at the location where the legs 10 engage the rubber. In the mounted position the wiper blade 2 and the longitudinal strip 4 are mutually fixated by the legs 10 at the location of the interconnection of the connecting device 6 and the wiper blade 2, whereas in the mounted position the wiper blade 2 is allowed to move in longitudinal direction relative to the longitudinal strip 4 outside the location of the interconnection of the connecting device 6 and the wiper blade 2. The protrusion 12 does not enter the correspondingly shaped recess 14, but locally force the rubber inside the recess 14, thereby forming the C-shape. The retention of the wiper blade 2 additionally may also be the result of friction between legs 10 or the connecting device 6 and the rubber of the wiper blade 2.

FIGS. 5 and 6 correspond to FIGS. 3 and 4, respectively, wherein corresponding parts have been designated with the same reference numerals. More in particular, the FIGS. 5 and 6 show in perspective and in a top view (in cross-section) the working principle of the mutual fixation of the wiper blade 2 and the longitudinal strip 4 at the location of the connecting device 6 according to the second preferred embodiment. Like the connecting device 6 of the first embodiment, also this connecting device 6 has a U-shaped cross-section with legs 10 and a base 11. At least one of the legs 10 comprises two sidewardly and inwardly extending protrusions 15, while the longitudinal strip 4 is provided along an exterior edge 13 thereof with at least one sidewardly and outwardly extending protrusion 16 cooperating with a corresponding recess 17, as formed between the protrusions 15 on the connecting device 6. In other words, the recess 17 formed by between the protrusions 15 on one of the legs 10 of the connecting device 6 accommodates the protrusion 16 on the longitudinal strip 4. As can be seen from FIG. 5, the protrusion 16 on the longitudinal strip 4 is particularly plateau-like in the sense that it is made through a stamping operation in order to accurately control the shape of the protrusion 16. As depicted in FIG. 6, the protrusion 15,16 are slightly deforming the wiper blade (2) in the form of a S at the location of the recess 17. Consequently, the leg 10 having the protrusions 15 is slightly deforming the rubber of the wiper blade 2 at the location where the leg 10 engages the rubber. In the mounted position of the connecting device 6, the wiper blade 2 and the longitudinal strip 4 are mutually fixated by the legs 19 at the location of the interconnection of the connecting device 6 and the wiper blade 2, whereas in the mounted position the wiper blade 2 is allowed to move in longitudinal direction relative to the longitudinal strip 4 outside the location of the interconnection of the connecting device 6 and the wiper blade 2. Again, the retention of the wiper blade 2 additionally may also be the result of friction between legs 10 or the connecting device 6 and the rubber of the wiper blade 2.

As can be seen in FIGS. 1 and 2, the joint part 8 comprises a resilient tongue 18 extending outwardly, while the oscillating arm 7 has an U-shaped cross-section at the location of its connection to the joint part 8, so that the tongue 18 engages in an identically shaped hole 19 provided in a base of the U-shaped cross-section. The connecting device 6 with the wiper blade 2 is mounted onto the oscillating arm 7 as follows. The joint part 8 being already clipped onto the connecting device 6 is pivoted relative to the connecting device 6, so that the joint part 8 can be easily slided on a free end of the oscillating arm 7. During this sliding movement the resilient tongue 18 is initially pushed in against a spring force and then allowed to spring back into the hole 19, thus snapping, that is clipping the resilient tongue 18 into the hole 19. This is a so-called bayonet-connection. The oscillating arm 7 together with the joint part 8 may then be pivoted back in a position parallel to the wiper blade 2 in order to be ready for use. By subsequently pushing in again the resilient tongue 18 against the spring force (as if it were a push button), the connecting device 6 and the joint part 8 together with the wiper blade 2 may be released from the oscillating arm 7. Dismounting the connecting device 6 with the wiper blade 2 from the oscillating arm 7 is thus realized by sliding the connecting device 6 and the joint part 8 together with the wiper blade 2 in a direction away from the oscillating arm 7.

The invention is not restricted to the variants shown in the drawing, but it also extends to other preferred embodiments that fall within the scope of the appended claims. For example, a skilled person will understand, without any inventive labor, that both opposite exterior edges 13 of the longitudinal strip 4 could each comprise a recess 14, so that both legs 10 of the connecting device 6 each could be equipped with corresponding protrusions 12 extending sidewardly and inwardly (first preferred embodiment).

Likewise, both opposite exterior edges 13 of the longitudinal strip 4 could each comprise a sidewardly and outwardly extending protrusion 16, so that both legs 10 of the connecting device 6 each could be equipped with corresponding protrusions 15 forming recesses 17 extending sidewardly and inwardly (second preferred embodiment).

The invention claimed is:

1. A flat blade windscreen wiper device comprising an elastic, elongated carrier element which exhibits a curvature, as well as an elongated wiper blade of a flexible material having a wiping lip, which can be placed in abutment with a windscreen to be wiped and which is biased into a curved shape by the carrier element, which wiper blade includes at least one longitudinal groove, in which groove at least one longitudinal strip of the carrier element is disposed, the longitudinal strip being elongated in a longitudinal direction, which windscreen wiper device comprises a connecting device fabricated as a single monolithic body and supporting a pivotal joint part, said connecting device wrapping around opposite lateral sides of said longitudinal strip, wherein said wiper blade comprises a spoiler at a side thereof facing away from the wiping lip and the windscreen to be wiped, wherein said wiper blade and said longitudinal strip are mutually fixated by mutually cooperating protrusion/recess features of said longitudinal strip and said connecting device, wherein said longitudinal strip is provided along an exterior edge thereof with at least one recess cooperating with a corresponding, sidewardly and inwardly extending protrusion on the connecting device with a portion of said wiper blade being deformed into said recess at the location of the interconnection of said connecting device and said wiper, and wherein said wiper blade is allowed to move in the longitudinal direction relative to said longitudinal strip outside the location of the interconnection of said connecting device and said wiper blade.

2. The windscreen wiper device according to claim 1, wherein said connecting device is slightly deforming said wiper blade at the location of the interconnection of said connecting device and said wiper blade.

3. The windscreen wiper device according to claim 1, wherein said protrusion is slightly deforming said wiper blade in the form of a C at the location of the recess.

4. The windscreen wiper device according to claim 1, wherein said longitudinal strip is provided along an exterior edge thereof with at least one sidewardly and outwardly extending protrusion cooperating with a corresponding recess on the connecting device.

5. The windscreen wiper device according to claim 4, wherein said recess on the connecting device is formed between two sidewardly and inwardly extending protrusions on the connecting device.

6. The windscreen wiper device according to claim 4, wherein said protrusions are slightly deforming said wiper blade in the form of a S at the location of the recess.

7. The windscreen wiper device according to claim 1, wherein said joint part is detachably connected to said connecting device by engaging protrusions of said connecting device, at the location of said pivot axis, in recesses provided in said joint part.

8. The windscreen wiper device according to claim 7, wherein said joint part has an at least substantially U-shaped cross-section at the location of its connection to said connecting device, and wherein said joint part is provided with a recess provided coaxially with said pivot axis.

9. The windscreen wiper device according to claim 7, wherein the protrusions extend outwards on either side of said connecting device.

10. The windscreen wiper device according to claim 7, wherein said protrusions are provided with co-axial through holes.

11. The windscreen wiper device according to claim 7, wherein said joint part comprises at least one resilient tongue rotatable along a hinge axis between an outward position for retaining said wiper blade onto the oscillating arm and an inward position for releasing said wiper blade from the oscillating arm.

12. A flat blade windscreen wiper device, comprising: an elongated wiper blade of a flexible material having a wiping lip, which can be placed in abutment with a windscreen to be wiped, and a spoiler facing away from the windscreen to be wiped, which wiper blade includes at least one longitudinal groove, in which groove at least one longitudinal strip of a carrier element is disposed, the longitudinal strip being elongated in a longitudinal direction and being curved to bias the wiper blade into a curved shape, which wiper blade comprises a connecting device for pivotally connecting an oscillating arm to said connecting device about a pivot axis near one end thereof, with the interposition of a joint part, wherein said connecting device is fabricated as a single monolithic body, said connecting device wrapping around opposite lateral sides of said longitudinal strip, wherein said wiper blade and said longitudinal strip are mutually fixated by mutually cooperating protrusion/recess means of said longitudinal strip and said connecting device, said protrusion/recess means of said longitudinal strip and said connecting device extending only along a single side of said longitudinal strip and said connecting device with a portion of said wiper blade being deformed into said recess means at the location of the interconnection of said connecting device and said wiper blade, and wherein said wiper blade is allowed to move in the longitudinal direction relative to said longitudinal strip outside the location of the interconnection of said connecting device and said wiper blade.

* * * * *